United States Patent [19]

Moorehead

[11] Patent Number: 4,803,353

[45] Date of Patent: Feb. 7, 1989

[54] LIGHT ATTENUATION MOTION TRANSDUCER WHEREIN TWO FIBER OPTIC CABLES ABUT AT THE PIVOT AXIS OF PIVOTABLE MOUNTING MEMBERS

[76] Inventor: Robert M. Moorehead, 202 Hyde Park, Richardson, Tex. 75080

[21] Appl. No.: 172,367

[22] Filed: Mar. 24, 1988

[51] Int. Cl.$^4$ .......................... H01J 5/16; G01D 5/34
[52] U.S. Cl. ............................... 250/227; 250/231 R; 350/96.21
[58] Field of Search ............... 250/227, 231 R, 231 P; 350/96.21, 96.15; 73/705

[56] References Cited

U.S. PATENT DOCUMENTS

| | | | |
|---|---|---|---|
| 4,384,203 | 5/1983 | Wells | 250/227 |
| 4,695,126 | 9/1987 | Cook | 350/96.21 |
| 4,741,590 | 3/1988 | Caron | 350/96.21 |
| 4,747,659 | 5/1988 | Takahashi | 350/96.21 |

*Primary Examiner*—David C. Nelms
*Assistant Examiner*—William L. Oen

[57] ABSTRACT

A transducer is described which converts a mechanical motion input to variation in the light attenuation characteristic of a fiber optic cable by mounting the cable on and transverse of the pivot axis of mutually pivotable planar mounting surface members with the cable being severed at the mounting surface members pivot axis so as to effect a hinging action of abuttable cable severed ends with attendant light leakage in response to the mechanical motion input being coupled to at least one of the cable mounting surface members.

5 Claims, 3 Drawing Sheets

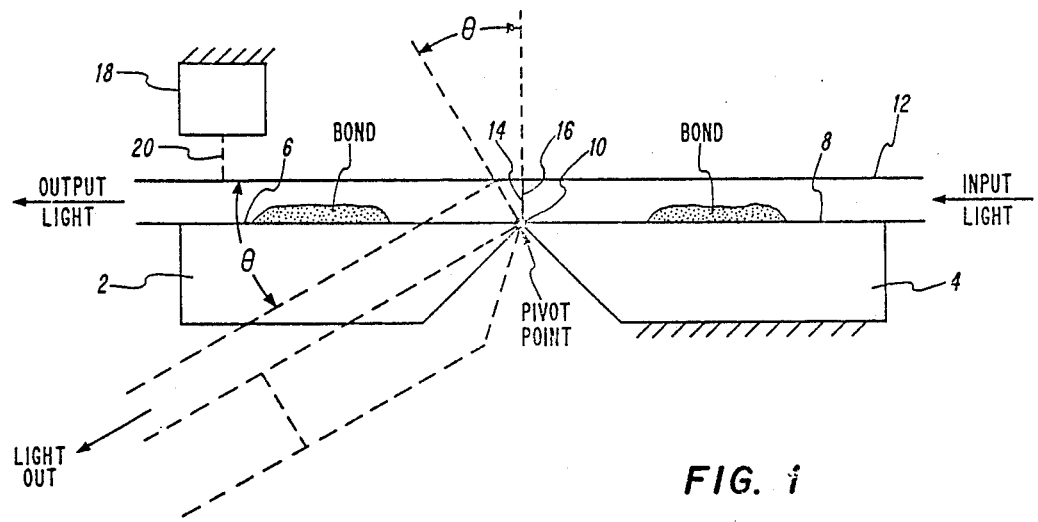
FIG. 1
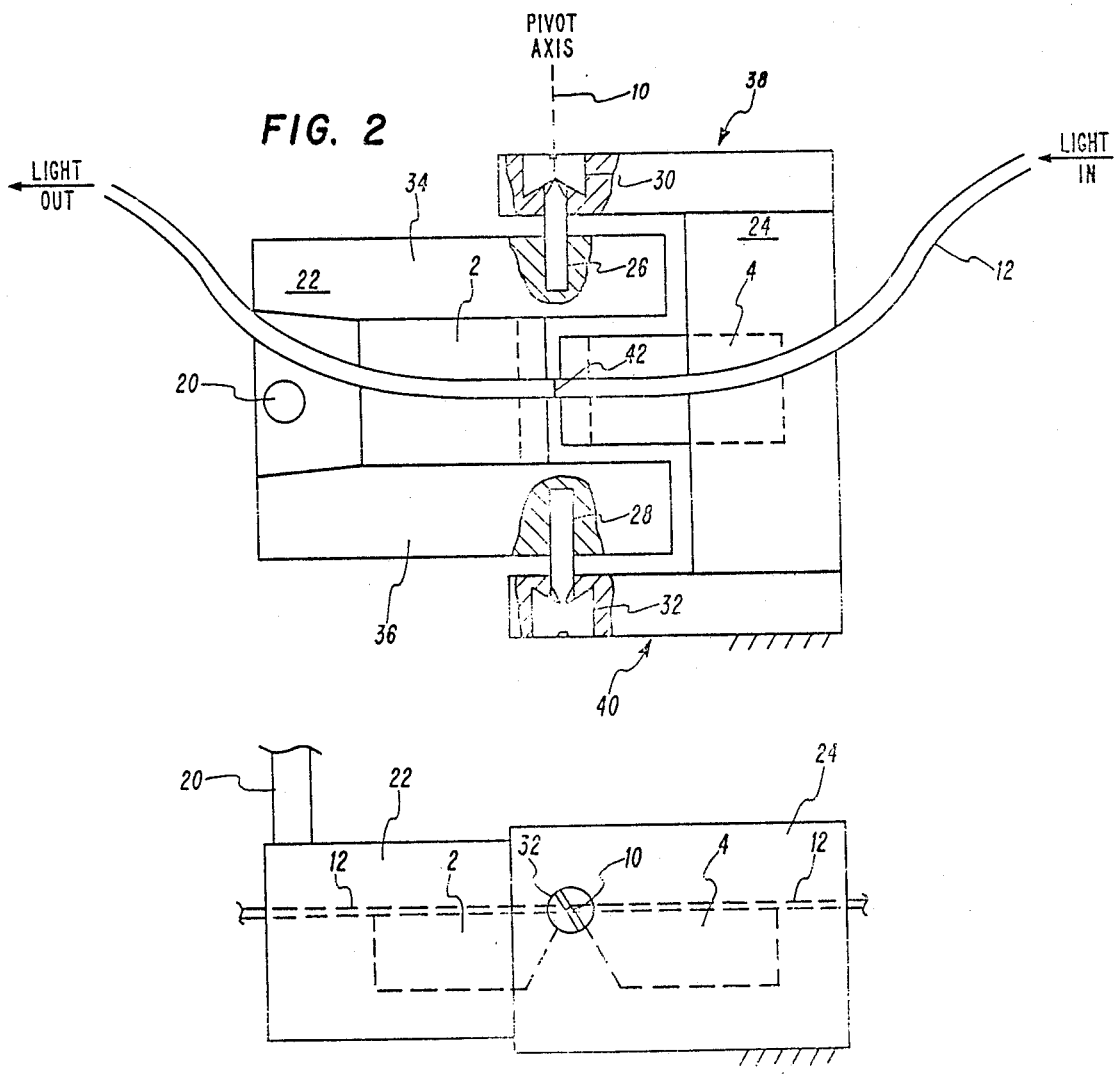
FIG. 2
FIG. 3

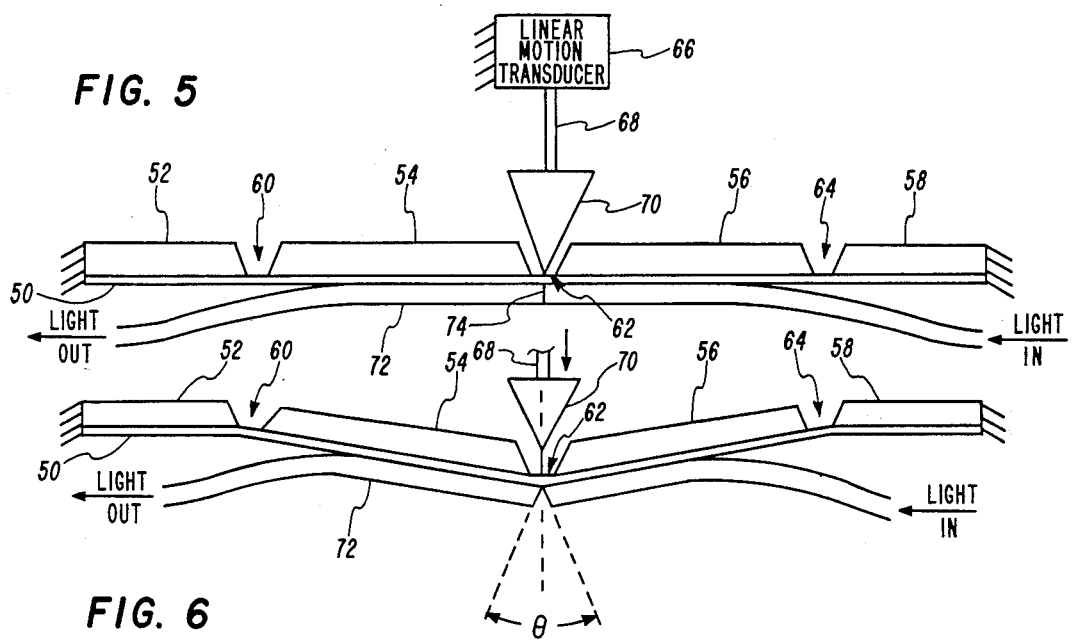
FIG. 5
FIG. 6
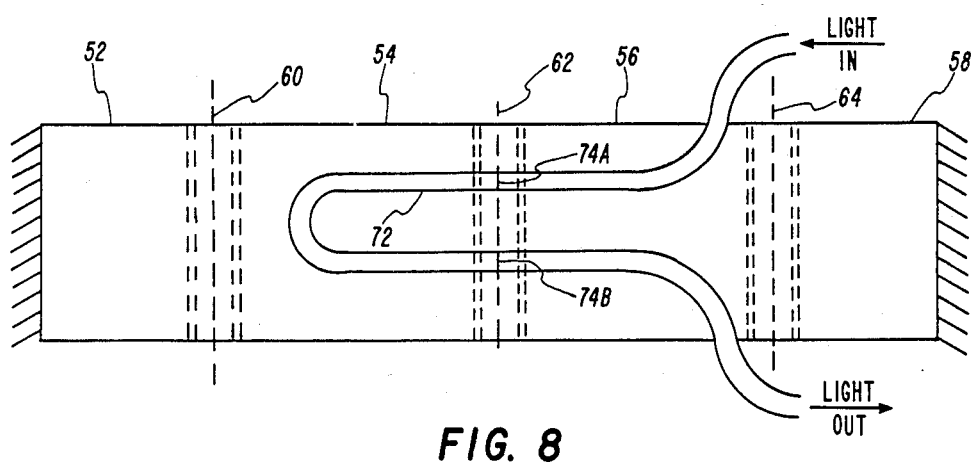
FIG. 8
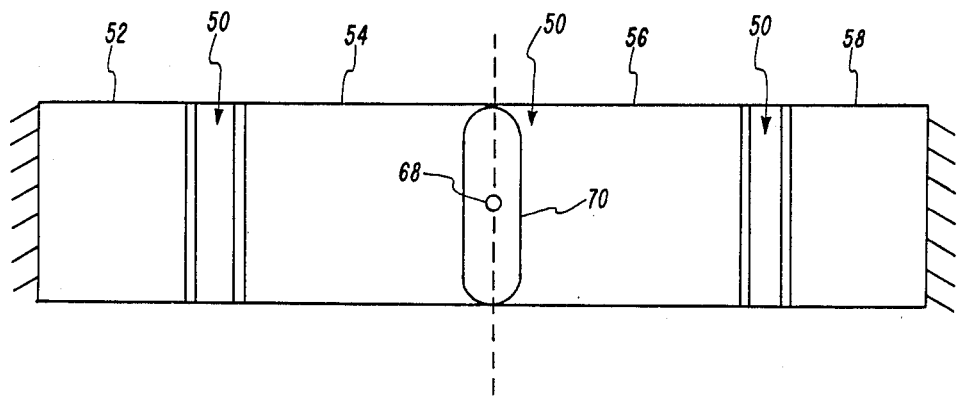
FIG. 7

LIGHT ATTENUATION MOTION TRANSDUCER WHEREIN TWO FIBER OPTIC CABLES ABUT AT THE PIVOT AXIS OF PIVOTABLE MOUNTING MEMBERS

This invention relates generally to electromechanical transducers and more particularly to a transducer which converts linear motion such as travel of a shaft member to a predictable change in the light transmission characteristic of a fiber optic cable.

A need often arises to provide a measurement of a varying parameter at a remote location. One such need is, for example, the remote measurement of variation in pressure existing in an environment which may be inaccessable for direct measurement due to physical inaccessability of that environment and/or the hostility of the environment in which a deserved parameter is to be measured. For example, remote readings of water pressure at great ocean depths is often read remotely by means of types of transducers which convert environmental pressure to an electrical signal which may be carried through electrical wiring or otherwise transmitted to a remote location for readout. In some environments, the use of electrical interconnects to power and transmit measured parameter information to remote readout locations is precluded by the hostile environment in which the measure parameter exists. Electrical signal transmitting means on shipboard, for example, may be hazardous should electrical interconnects be employed between a measuring device and a remote readout station for that device, where such electrical interconnects and/or parameter to be measured are in or must pass through explosive environments.

Further, electrical interconnects are subject to electrical interference such as electromagnetic induction interference (EMI), radio refrequency interference (RFI), and electromagnetic pulses (EMP), and such interference may at best give rise to inaccuracy in remote relevant and, at worst, cause explosions to occur when electrical interference between a measuring transducer and remote readout passes through, or is contained in, explosive environment.

An object of the present invention is therefore the provision of remote readout of a parameter measurement which is immune to RFI, EMI, and EMP.

A further object of the present invention is the provision of remote readout of a measured parameter wherein there is no electrical interfoil between a measuring transducer and a remote readout station.

A still further object of the present invention is the provision of remote readout of a measured parameter effected by employment of transducers means which exhibit minimal hysteresis and stiction characters to thereby provide accuracy and predictability of the obtained readout.

The invention is featured in the provision of low stiction and hysteresis means employed to effect predictable variation in the light transmitting characteristics of a fiber optic cable between a mechanical parameter measuring transducer and electrical remote readout wherein the interfall between measuring device and output readout means is a non-electrical fiber optic cable.

A further feature of the present invention is the provision of mechanical input transducer which converts variation in a parameter to be measured to linear travel of a shaft, with such linear shaft motion affecting a predictable variation in the light transmitting characteristic of an optical fiber cable in response to the linear shaft motion.

These and other objects and features of the invention will become apparent upon reading the following description with reference to the accompanying drawings in which:

FIG. 1 is a functional representation of the operating principle of the invention;

FIG. 2 shows a top view of a structure by means of which the operating principle is realized;

FIG. 3 shows a side view of the structure of FIG. 2;

FIGS. 5-8 show respective side, top and bottom views of a still further embodiment of the invention.

Figure 4:
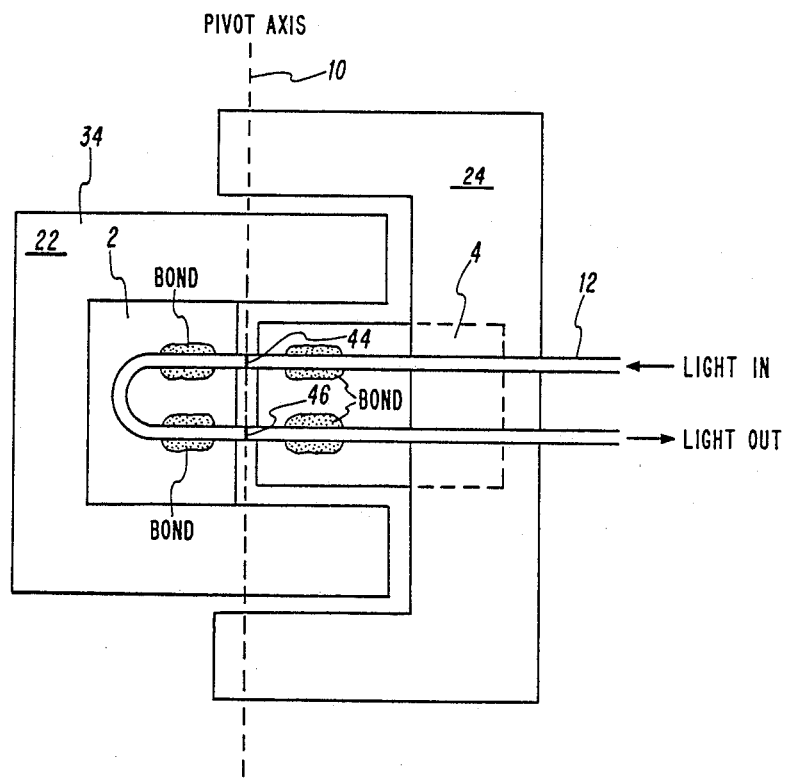
FIG. 4 shows a top view of a further embodiment of the structure of FIG. 2.

The feature whereby linear shaft travel motion is transduced into variation in the light transmitting characteristics of a fiber optic cable is diagrammatically shown in FIG. 1. A pair of mounting members 2 and 4 are shown with respective upper surfaces 6 and 8 in coplanar relationship. Mounting member 4 is depicted as being mounted in a fixed position. Tapered end extremes of mounting members 2 and 4 essentially meet at a pivot axis 10, and mounting member 2 is downwardly pivotable about pivot axis 10 with respect to fixed mounting member 4, with pivot axis 10 being coplanar with the respective upper surfaces 6 and 8 of mounting means 2 and 4. A fiber optic cable 12 is carried across pivot axis 10 and severed such that respective severed ends 14 and 16 are juxtaposed, with pivot axis 10 being essentially tangent to each of cable severed ends 14 and 16 at a common peripheral point. The cable "halves" are fixed to their respective mounting surfaces 6 and 8 by bonding.

Mounting member 2 is pivotable about pivot axis 10 with respect to the fixed mounting member 4, and, as diagrammatically depicted in FIG. 1, a linear motion output transducer 18, is fixed-mounted with respect to optical cable mounting member 4, and effects linear travel of an output shaft 20 which communicates with the pivotable mounting member 2 to cause this member to pivot through on angle 0, whereby the fiber optic cable ends are pivoted through a like angle 0 to effect axial misalignment between the cable severed ends. With this arrangement, light passing through the fiber optic cable 12 is attenuated as a function of the rotation angle 0, and the attenuation, due to leakage of light at the misaligned severed ends of the cable, produces a change in light output that, although non-linear, is predictable with a minimum of hysteresis. This predictabliilty then lands itself employment of various linearization techniques to correct offset and nonlinearity which might exist in the light attenuation characteristic of the transducer.

The geometric relationships depicted diagrammatically in FIG. 1 may be mechanically embodied by the structure shown in FIGS. 2 and 3.

FIGS. 2 and 3 show respective top and side views of a structure comprising a pair of yoke members 22 and 24. Outer yoke member 24 is depicted as being in fixed-mounted position, with inner yoke member 22 being pivotably mounted with respect to outer yoke member 24 about pivot axis 10. The pivot axis 10 is defined by pivot pin inserts 26 and 28 in the respective arms 34 and 36 of inner yoke member 22, with pin members 26 and 28 communicating with jewel-bearing inserts 30 and 32 received in respective fixed arm members 38 and 40 of outer yoke member 24.

As shown in FIGS. 2 and 3, a fiber optical cable mounting member 2 extends transversely between arm members 34 and 36 of inner yoke member 22, and a fiber optic cable mounting member 4 extends transversely between arm members 38 and 40 of outer yoke member 24. Inner extremes of cable mounting members 2 and 4, as shown in FIGS. 2 and 3, are juxtaposed, and in the relative positions shown in FIGS. 2 and 3, provide coplanar upper mounting surfaces. In the illustrated position of the inner and outer yoke members, the adjacent inner ends of the cable mounting members 2 and 4, are essentially coincident with the pivot axis 10 of the assembly.

As best shown in the top view of FIG. 2, a fiber optic cable is mounted to the upper surfaces of cable mounting members 2 and 4, with the cable 12 being cut or fractured at 42 such that the pivot axis is tangent to the bottom surfaces of the cable halves. The geometric relationship between cable halves, as depicted in FIG. 1, is thus relayed by the mounting structure of FIGS. 2 and 3, with inner yoke member 22 being pivotable with respect to fixed outer yoke member 24 in response to downward linear motion of shaft 20 which communicates with the upper surface of the inner yoke member 22.

As described, pivot action of the inner yoke member 22 with respect to outer yoke member 24 introduces an angular relationship 0 between the planes defined by cable mounting surfaces on mounting members 2 and 4 to introduce attenuation in light passing through fiber optic cable 12, and this attenuation is a predictable and repeatable function of the pivot angle 0. Linear motion, as might be imparted by a linear motion transducer through shaft 20, is thereby converted to a variation is light passing through optical fiber cable 12.

As shown in FIG. 4, the light attenuation relationship between a given linear motion input to the device, as by input shaft 20, to define a given angular relationship 0 between severed cable ends, may be varied by mounting cable 12 on respective mounting members 2 and 4 so as to transverse the pivot axis 10 a selected plurality of times. As exampled in FIG. 4, the cable 12 is shown looped to turn back across pivot axis 10 and is severed at each point 44 and 46 where the cable run transverses pivot axis 10.

In this manner the light attenuation imparted by cable 12 as a function of the pivot angle 0 is proportionally greater for any given angle 0, since light passing through cable 12 is caused to leak at more than one severed point. The sensitivity of the device to a given change in pivot angle 0 may thus be increased. Although the embodiment of FIG. 4 examples the cable 12 being returned across the pivot axis a single time, further cable run reversals on mounting members 2 and 4 may be incorporated with the cable severed at each crossing of pivot axis 10 to introduce greater light attenuation for any given pivot angle 0, thereby permitting the flexibility of tailoring the sensitivity of the device to fit a given design range of pivot action.

In the embodiment above-described, it is seen that the light attenuation characteristic of an optical fiber is effected by a hinging action between abutted severed ends of the cable and this action is embodied by effecting a hinging action between respective mounting plane members to which the cable run is affixed, with the abutted severed cable ends lying along the pivot axis of the hinge.

A further embodiment of the present invention is shown in FIGS. 5–8.

Referring to FIG. 5, a resilient thin stainless steel sheet 50 has respective ends fixed mounted, in a suitable mounting frame. The thin sheet member 50 might comprises 0.002 inch thick stainless steel. Respective ends extents of sheet 50 are stiffened by less flexible plate members 52 and 58, with intermediate extents of sheet 50 stiffened by less flexible plate members 54 and 56. End stiffening plates 52 and 58 may be affixed, as by bonding to the surface of sheet 50 and to the fixed mounting frame. Intermediate stiffening plates 54 and 56 are affixed likewise to sheet 50 such that a relatively short expanse 60 of sheet 50 exists between plates 52 and 54. Likewise, a short expanse of sheet 50 exists between plates 54 and 56, and a further short expanse 64 of sheet 50 exists between plates 56 and 58. The structure is symmetrical, with the central expanse 62 of sheet 50 between stiffening plates 54 and 56 lying at the midpoint of sheet 50. A wedge member 70 addresses the upper depicted surface of sheet 50 at the center unstiffened extent 62 of sheet 50, and, as shown in top view of FIG. 8, extends across the surface of sheet 50. As shown in FIG. 5, wedge 70 is affixed to the output shaft 68 of a linear motion transducer 66.

A fiber optic cable 72 extends along the surface of sheet 50 and may be affixed to sheet 50 along extents which are stiffened by plates 54 and 56. Cable 72 is circumferentially severed at 74 with respective severed ends being abutted in the absence of loading imparted by wedge 70 as shown in FIG. 5.

Referring now to FIG. 6, the structure of FIG. 5 is shown under a loaded condition imposed by motion of transducer shaft 68 which imparts a load on the central unstiffened extent 62 of sheet member 50. As shown the unstiffened extents 60, 62, and 64 of sheet 50 exhibit a hinging action and the extents of sheet 50 to which central stiffening plates 54 and 56 are affixed are no longer in coplanar relationship. Fiber optic cable 72, which is affixed to the extents of sheet 50 stiffened by plates 54 and 56, likewise exhibits a hinging action at the severed location 74. As in the previously described embodiment, the light attenuation characteristic of the fiber optic cable 72 is a function of the angle 0, and thus a function of the linear motion of transducer 66 which is imparted through wedge 70 to the As in the previously described embodiment of FIGS. 1–4, the fiber optic cable may be serpentined back and farther across the central hinge section 62 of the mounting sheet 50, and severed at the hinge axis of the mounting planes defined by stiffening plates 54 and 6.

As shown in FIG. 8, fiber optic cable 72 is shown to be returned across the hinging axis 62 with the cable 72 being severed at each of the points 74a and 74b. With this modification, the light attenuation imported by the fiber optic cable run, for any given pivot angle 0 as shown in FIG. b, is increased, and the attenuation characteristic thereby increased. Still further mounting plane hinging axis cable crossings may be incorporated as desired to increase the sensitivity of the device to any given linear motion shaft input.

A further modification of the fiber optic cable mounting plane structure of FIGS. 5 and 6 which defines the hinging axes 60, 62, and 64 might comprise machining transverse grooves into a relatively stiff mounting plate to define these axes rather than employing stiffening plates affixed along a thin resilient sheet member.

Although the present invention has been described herein with respect to particular embodiments thereof, it is not to be so limited, as changes might be made therein which fall within the scope of the invention as defined in the appended claims.

I claim:

1. A transducer for converting linear motion into a predictable variation in the light attenuation characteristic of a fiber optic cable comprising; a fiber optic cable circumferentially severed with respective severed ends abuttable to effect a minimum attenuation of light being transmitted therethrough; an input coupling arm member, and means responsive to a linear motion of said input coupling arm member for effecting a variable angular relationship between the longitudinal axes of respective abutted severed ends of said cable by rotation of at least one of said abuttable pair of said severed cable ends about an axis lying in the plane defined by that abuttable pair of said severed cable ends and tangent to a radius common to each pair of said abuttable severed cable ends.

2. A transducer as defined in claim 1 wherein said means for effecting said angular relationship between the longitudinal axes of respective abutted severed ends of said cable comprises first and second concatenous planar mounting surface members, means communicating with and responsive to said linear motion of said input coupling arm member for pivoting at least one of said concatenous planar mounting surface members about a pivot axis common to each of said planar mounting surface members, and said optical cable being fixed-mounted to each of said planar mounting surfaces transversely of said pivot axis, with said pivot axis lying in the plane defined by said abuttable severed ends of said cable.

3. A transducer as defined in claim 2 wherein said cable is carried transversely across the pivot axis of said mounting surface members at least once, said cable being circumferentially severed at each transverse cable crossing of said pivot axis and fixed-mounted to each of said planar mounting surfaces for an extent on each side of said pivot axis.

4. A transducer as defined in claim 3 wherein said first and second concatenous mounting surface members are carried by respective first and second U-shaped yoke members each have a pair of arms, the arms of said first yoke member being received within the arms of said second yoke member and pivotably mounted with respect thereto to define a yoke pivot axis, said first and second concatenous planar mounting surface members extending between and affixed to respective arm-pairs of said first and second yoke members, said yoke pivot axes lying in the planes defined respectively by said first and second planar mounting surface members, and said linear motion input coupling arm member communicating with at least one of said first and second yoke members to effect a hinging action between the planes respectively defined by said planar mounting surface members.

5. A transducer as defined in claim 3 wherein said concatenous planar mounting surface members comprise respective concatenated extents of a resilient metallic sheet-like member having end extremes thereof rigidly affixed to respective fixed parallel end mounting means, said sheet member having at least one reduced thickness expanse extending into a first surface thereof and transversely across said sheet member at a point intermediate said sheet member fixed end mounting means, said linear motion input coupling arm member communicating with said first surface of said sheet member to effect a pivot-like action between planes defined by respective sheet member thicker extends adjacent said reduced thickness expanse thereof, said cable being fixed-mounted to the second surface of said sheet member thicker extents adjacent said reduced thickness extent thereof with severed cable ends being abuttable at the reduced thickness expanse of said sheet-like member.

* * * * *